Feb. 28, 1939.  J. P. BEDFORD  2,148,428
VEHICLE DIRECTIONAL SIGNAL
Filed Aug. 11, 1934
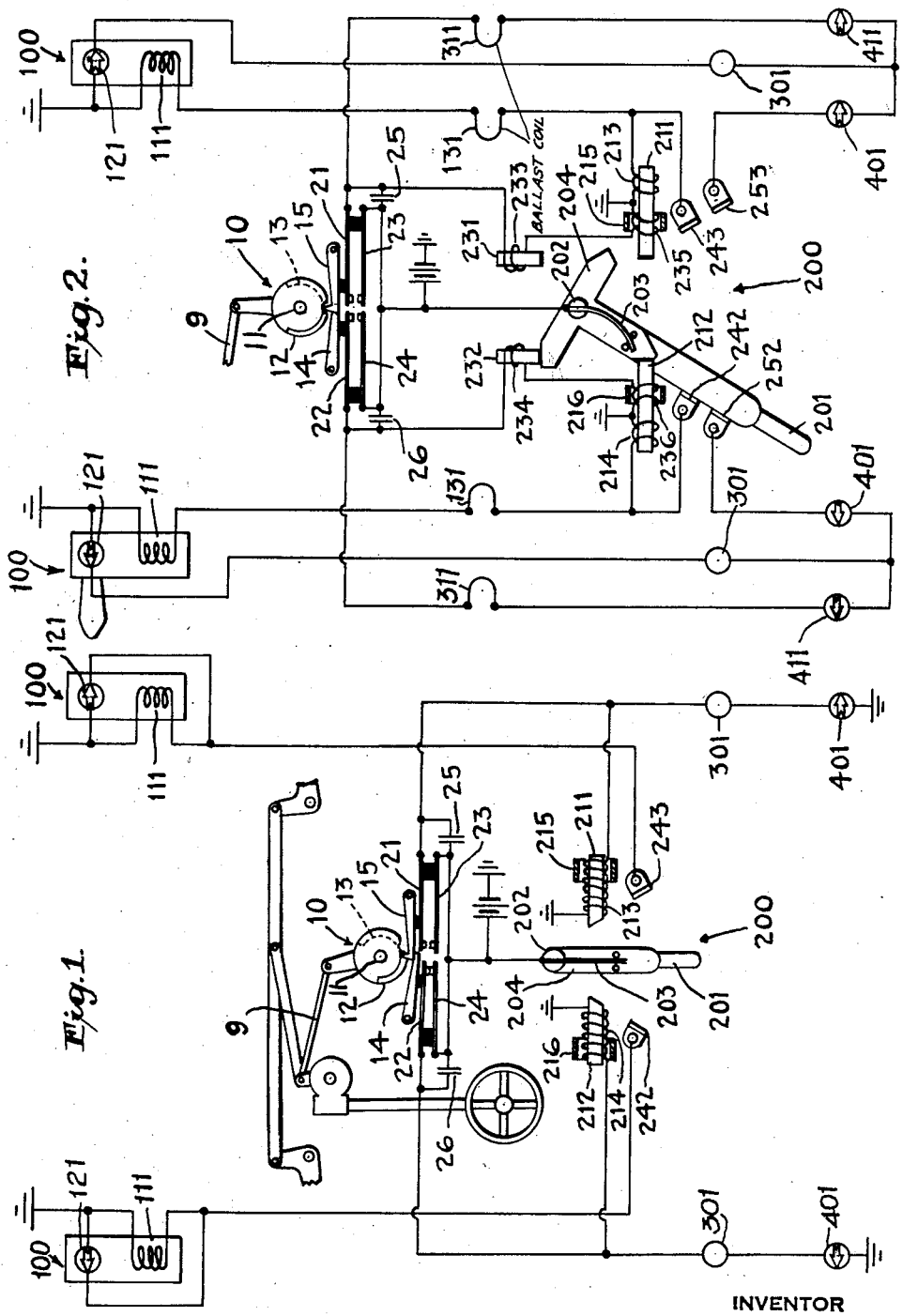
INVENTOR
James P. Bedford Patented Feb. 28, 1939

2,148,428

UNITED STATES PATENT OFFICE 2,148,428

VEHICLE DIRECTIONAL SIGNAL

James P. Bedford, New York, N. Y.

Application August 11, 1934, Serial No. 739,463

9 Claims. (Cl. 177—337)

This invention relates to a motor vehicle directional signal system and more particularly to a method and means for turning the signals on and off by a combination of manual and automatic control.

An object of this invention is to provide in a vehicle directional signal system for indicating a turn to the right or left a primary and a secondary signal indication.

Another object of this invention is to provide in a vehicle directional signal system for indicating a turn to the right or left a plurality of effects in the signal indications under separate and different conditions.

Another object of this invention is to provide means by which a driver of the vehicle may give a directional signal indication of his intention to make a turn by a manual operation of a controller switch to the right or to the left to cause the actuation of a signal to indicate a turn in the corresponding direction.

Another object of this invention is to provide in a vehicle directional signal system composite control of the signal indications, comprising energization of the signals at will by the driver of the vehicle and automatic deenergization by the steering control of the vehicle.

Another object of this invention is to provide direction indication signal means for giving a right or left turn indication automatically when the vehicle steering mechanism is turned for a change from a comparatively straight ahead direction.

Another object of this invention is to differently characterize the signal indication volitionally initiated by the driver from those automatically controlled.

A further object of this invention is to provide in combination with a set of semaphore indicating signals positioned on each side of a motor vehicle a second set of illuminated signals at the rear of the vehicle which are automatically turned on and off concurrently with the operation of the semaphore signals.

In the operation of motor vehicles it is desirable to cause a signal indication of a directional change either when the driver deliberately contemplates making a turn, such as a right angle turn into a lateral street, and also when making a turn out of a generally straight ahead direction for other reasons.

Where a contemplated turn is to be made, for example, into a lateral street, the intention of the driver must be prominently displayed before the actual turning of the vehicle is commenced, and therefore this must be accomplished by a volitional indication of his intension in advance of commencing such turns. The laws of various states require that such intention to turn must be clearly signified by the driver at least fifty feet in advance of commencing all such turns.

In the arrangement employed in this invention signaling means are provided to indicate to drivers of other cars all turns of the signal-equipped car, both those that are deliberately contemplated and those that are made for other purposes, and this system indicates these two types of turns by characteristic indications. Where a contemplated turn is to be made such as a right angle turn into a lateral street this system provides a primary signal indication, consisting of an illuminated semaphore signal displayed on the side of the car toward which the car is to be turned and pointing the direction that the car is to take. Concurrently with the display of the semaphore directional signal a signal on the rear of the car illuminates, and its position and shape likewise point the direction of the contemplated turn. All direct or contemplated turns are therefore provided by this system to be indicated in this manner.

The deliberately contemplated turns are caused to be indicated by the driver manually operating a controller, and other turns of the car from a generally straight direction are caused to be indicated automatically by the movement of the steering control.

The automatic indication provided in this system is a secondary indicating means and warns of minor turns of the car such as to approach a curb or to pass a car ahead or to avoid obstructions in the road. Warnings of these minor turns are provided to be given automatically since drivers otherwise usually fail to give any notice to drivers of other cars when making such turning movements.

The automatic indication shows the drivers of following cars not only that a turning movement is being commenced but also the direction of such a turn, and thereby always receive notice of a commenced turning movement of the signal-equipped car from the moment that the steering control is sufficiently moved to cause the turning of the car. By this automatic indicating means drivers of other cars are more readily aided to govern their own speed and direction accordingly and thereby greater safety to the signal-equipped car as well as following cars is afforded by the notice given of such turns by the signal indication. Such automatically caused notice, though it may be only a few moments in advance of the car's turn when moving rapidly, may be a very important means of avoiding accidental collisions or sideswiping of the cars, and when moving at less speed, such as in turning to approach a curb, a relatively greater amount of notice is provided.

For whatever cause, however, that the turning of the signal-equipped car is caused, a signal indication of all such turning movements, deliberately contemplated or otherwise, is important not only to the driver and occupants of the car, but also to the drivers of other cars and may give the latter an effective notice that an inexperienced or erratic or intoxicated person is driving, by an unnecessarily frequent display of the automatic signal indications.

The automatic indication given by such signal-equipped car is obviously more direct and arresting and secures prompter attention than the present practice in which minor turns are made that no indication is given of until the car has assumed the turned position, which may not be quickly enough or clearly enough seen by the drivers of following cars, particularly at night, to avoid accident.

This system further provides a telltale light for notifying the driver of the car that his signals are functioning. When this is employed further security toward safer driving is attained, as this provides an indication to the driver and to other occupants of the car of any frequent turning or swerving from the usually direct line of travel and may thereby call his or their attention to unusual or unnecessary deviations of steering even if they were not otherwise directly aware of it. The lighting of the telltale automatically also gives the careful driver an indication to be alert at that moment as it directly notifies him of his departure from a generally straight line of travel and consequently perhaps into the line of travel of a fast overtaking car attempting to pass on the side.

The automatic control of the signal indication is auxiliary to the manual control and is not designed to function in place of it or to relieve the driver of volitionally signaling his intention of making a contemplated turn in advance of commencing such turns. In the arrangement employed in this invention semaphore signals preferably are positioned at each side of the car and are actuated into signaling position by the driver's operation of a controller positioned convenient to his driving position.

The semaphore signals operate only when the driver operates his controller. He is relieved, however, from further attention to the semaphore signal after causing its display, since when the car assumes a straight ahead direction the semaphore is automatically returned to non-indicating position. The actuation of the semaphore signals into signaling position is, therefore, always caused by the driver volitionally, but they are returned to their non-indicating position automatically.

The automatic signal indication as herein employed is preferably provided by illumination of rear signal lamps and also, if desired, by the lighting of the lamps in the semaphore arms, although the semaphore arm is not raised from its rest position when the automatic control operates. To show the light in the semaphore arm when illuminated in its rest position a cut-out in the front and rear sides of the semaphore housing adjacent to its lamp may be employed, or if it is desired to mount the semaphores in recesses in the car body one or two raised glass jewels may be positioned in the outer edge of the semaphore arm adjacent to the enclosed lamp. The automatic lighting of the semaphore arms by the automatic control may be omitted and only the rear lamps caused to light when the automatic control operates. The purpose, however, of arranging the semaphore to show a light when the rear lights are illuminated by the automatic control is to give an automatic indication to the driver of a car that may be alongside and somewhat to the rear, in which position the rear lights would not be within his vision. The illumination of the glass jewels of the semaphore, particularly at night, however, would be clearly visible to the drivers of other cars from the position mentioned, since such cars would then be in relatively close proximity.

The rear lights may be positioned at the center in the rear of the car, but preferably one on the right side and one on the left side. The automatic indication, therefore, not only indicates a turning movement of the car, but also indicates the direction of the turning movement. A turning movement of the steering mechanism to cause a change in the direction of the car to the right will cause the signal on the right side at the rear to illuminate and a change in direction to the left will cause the signal on the left side at the rear to illuminate. These rear lights may be circular in their illumination but preferably each may show a small illuminated arrow pointing outwardly of the car in their respective positions.

The telltale light employed in this indicating system is positioned in front of the driver, preferably on or adjacent to the instrument panel of the car. This telltale lights when either of the semaphore signals is operated by the driver and also when the automatic control operates; or it may be arranged to light only upon actuation of the voluntarily operated semaphore signal. It may also be arranged to show a dim light for automatic, and a bright light for volitional operation of the indicating signals; or may be arranged to show different colors for the volitional and automatic signal indications if desired.

This system functions in several ways to secure greater safety of driving. A prominently visible and unmistakable signal is employed for indicating all turns contemplated by the driver, the semaphore arm showing plainly by day or night when actuated into signal position and pointing outwardly from that side of the car in the direction that the turn is to be made, the raised arm also being illuminated. This is the primary means of signal indication in this system to indicate contemplated turns of the driver. The rear light also illuminates at the same time. All turns of the car away from a relatively straight line of travel, not deliberately contemplated and signified by the driver, are indicated without any attention or effort on the part of the driver. This is the secondary means of signal indication in this system. The telltale light automatically indicates to the driver that his signals are functioning.

A more detailed description of the invention follows and is illustrated in the accompanying drawing.

Fig. 1 is a diagrammatic circuit system drawing for both right and left directional signals showing the characteristic elements connected in a simple operative arrangement; and Fig. 2 is a diagrammatic circuit system drawing showing a more complete arrangement than that shown in Fig. 1.

Similar reference characters on the different drawing figures refer to corresponding parts.

The mechanical parts of the signal and the mechanical elements of the operating mechanism have been largely omitted to simplify the drawing and as not being novel parts of this invention. This invention is applicable, for example, to vehicle directional signals of the type disclosed in the patent to John W. Haywood, No. 1,827,289, issued October 13, 1931, and the patent to James P. Bedford, No. 1,768,538, issued July 1, 1930, each of which discloses signals which are operatable electrically as well as pneumatically, the former showing the mechanism actuated by an electromagnet power unit and the latter stating that the actuating means may be an electrical means involving a solenoid, and each employs an electrically illuminated indicating member. This invention is an improvement upon, and a novel extension of the method of electrical operation and control, of signals similar to the type shown in the patents referred to above.

The drawing shows two main modifications in which the apparatus elements function somewhat differently as will be explained later. In one arrangement a single circuit with grounded return, and in the other arrangements a double circuit with grounded return, is employed for interconnecting the various apparatus units.

Referring to Fig. 1, a simple general schematic plan of a motor vehicle directional signal system according to this invention is shown. The right and the left directional signals 100 each connects with the driver's manually operated controller mechanism 200. A power unit 111 and an electric light 121 in each of the signals are connected in multiple, one side being grounded and the other connected to the controller.

Right and left lamp signals 401 are positioned on the rear of the vehicle. Right and left telltale lamps 301 are positioned in view of the driver and light whenever the rear signals are operated.

In addition to operating the semaphore arm of the directional signal and its lamp by means of the driver's manually operated controller, means actuated by the steering mechanism of the vehicle is provided for automatically discontinuing the indication of all signals and for turning on and off the signals at the rear of the vehicle as the driver oscillates from straight ahead. The driver must by means of his controller cause an indication by means of the semaphore directional signal but he is relieved of discontinuing such signal as the control connected with the steering gear will automatically cause the return of the driver's controller to neutral position when the vehicle resumes a straight ahead position. This automatic control mechanism 10 is associated with the steering gear of the vehicle by means of any suitable connection such as by rod 9 connected with the crank arm associated with the worm gear which is connected to the cross-connecting rod or otherwise to the front wheels. The connecting rod 9 causes rotation of a fraction of a revolution of the two cam discs 12 and 13. They are positioned on the shaft 11 side by side and so angularly located that when the vehicle is being steered straight ahead both the cam engaging levers 14 and 15 are engaging the low part of the cams 12 and 13, respectively. When a change in direction is made by turning the front wheels a small amount to the right or to the left the high portion of a cam member actuates one or the other of the cam arms 14 or 15 a small amount thus closing contacts 21—23 or 22—24, the former when the vehicle is steered to the right and the latter when the vehicle is steered to the left. The drawing shows a turning to the left. Both sets of these contacts are open when the vehicle is being steered straight ahead and one or the other is always closed when a turn is underway. Each set of these contacts is in circuit with a telltale 301 and the rear light signal 401 and with a holding magnet of controller 200. The interconnection with the controller mechanism 200 is for the purpose of automatically releasing it after a turn has been made and the vehicle is again being steered straight ahead. These contacts control the rear lights exclusively and cause a steady illumination thereof while the vehicle is changing direction to the right or to the left, respectively, the corresponding telltale lamp lighting simultaneously therewith. The control mechanism 10 associated with the steering gear can be so adjusted that the contacts therein operate when the steering direction is changed by a small amount or the setting may be such that a direction change of several degrees can be made before operating the contacts. These contacts associated with the steering gear, however, will cause a lighting of one or the other of the rear lights and its corresponding pilot light whenever a small variation in direction is made and this, as already stated, is advantageous in indicating to those in the car and to vehicles following that the driver causing an unusual amount of lighting is either incompetent, intoxicated, or falling asleep. The driver's controller 200 is shown as a single pole double throw switch having associated therewith electro-magnetic means for holding it in operative position either to the right or left and for releasing it when the vehicle is steered in a straight ahead direction after making a turn. Such right and left holding and releasing is accomplished by the electromagnets 211 and 212, respectively. They have windings 213 and 214 which are energized when a right or left turn, respectively, is to be made. The winding 213 is energized whenever contacts 21—23 are closed and the winding 214 is energized whenever contacts 22—24 are closed by the automatic circuit control 10 connecting with the steering mechanism of the vehicle. These holding magnets 211 and 212 are effective in holding the controller arm 201 only when it has been turned to the right or left and the respective winding is energized. The windings cause no effect when the arm 201 is in its non-operated or neutral position. The arm rotates about the fixed pin 202 and carries an armature 204 which is held by the magnets above mentioned. A spring 203 fixed in pin 202 causes the arm 201 to return to mid-position when the windings are deenergized. While these windings are energized whenever the automatic control mechanism 10 is actuated they perform a useful function only when the controller arm is manually turned into operative position. Electro-dynamic damping by the reaction of short-circuited secondary band windings 215 and 216 are employed in connection with these magnets to prevent releasing of the controller arm 201 when the current is momentarily interrupted due to a momentary straightening of the steering during a turning, it being desirable not to release the turn indication shown by the semaphore signal where such momentary swerving occurs. Other means such as a dash pot could be employed. Contacts 21—23 and 22—24 are protected by condensers 25 and 26, respectively.

Fig. 2 is a diagrammatic circuit drawing showing the characteristic elements of the system in a more complete arrangement than that shown in Fig. 1. One of the features in this arrangement is that the driver's controller upon being turned either to the right or to the left automatically holds in that position until the driver has made a turn and when the turn is completed and the vehicle has again taken a straight ahead direction the controller is automatically released and moves by spring action to neutral position thus causing the respective semaphore signal which was actuated to return to non-indicating position. Further, in this arrangement the driver's controller causes the energizing of both the primary and secondary signals and it is also arranged to permit manual restoration of the controller to neutral or even manual movement of it to cause the indication of a turn in the opposite direction before being released by the automatic control. In other words, the manual controller may be operated as the driver may desire independently of all other mechanism and he is always automatically relieved of returning the controller to its neutral position after a turn has been completed. In the arrangement shown when a turn is to be made and the driver has so indicated by his controller the proper directional indicating semaphore arm is raised and the lamp in it and at the rear of the vehicle as well as a telltale lamp before the driver light. As soon as the turn is started the automatic control also connects the lighting circuit in a manner to somewhat brighten the light in the semaphore arm, and in the telltale, and to light a second lamp at the rear, therefore, when the lights show at maximum brilliancy, the driver has indicated a turn by his controller and the turn is underway as shown by the lights being at maximum brilliance. When the driver makes a turn and the automatic control connects its light circuit all three lamps shine with a normal brilliance. The dual action of the two rear lights characterize the turn as between one volitionally determined upon by the driver and as one incident to ordinary driving. The right and left directional signals 100 comprise in addition to the semaphore directional indicating arm a lamp 121 illuminating the semaphore arm when raised and also showing through the housing when the arm is lowered, and an electric power actuating unit 111. The automatic circuit control means is operated, as shown in Fig. 1, by a connection with the steering gear of the vehicle for automatically discontinuing all signals and for turning on and off the secondary light signals and for restoring the driver's controller when a straight ahead position is taken. This automatic circuit control mechanism 10, as stated above, is associated with the steering gear of the vehicle by means of a rod 9. This connecting rod 9 causes a rotation through a part of a revolution of the two cam discs 12 and 13. They are here shown positioned on the shaft 11 side by side and so angularly located that when the vehicle is steered ahead the low part of both cams engages levers 14 and 15, respectively. When a change in direction is made by turning the front wheels a small amount to the right or left the high part of a cam actuates one of the cam levers 14 or 15, respectively, a small amount thus closing the contacts 21—23 or 22—24, the former when the vehicle is steered to the right and the latter when to the left. These contacts are protected against damage from sparking by the respective condensers 25 and 26. Both of these contacts are open when the vehicle is being steered straight ahead and only one set is closed when a turn is underway. As here shown, the vehicle is being steered straight ahead but the driver has indicated an intended turn to the left by the actuation of his controller. Each set of these contacts is in circuit with a telltale 301 and the rear light signal 401 and also with the light 121 in the directional semaphore signal. Each set of these contacts is also in circuit with the electro-magnetic holding and releasing magnets 211, 212, 231 and 232 of the driver's controller 200, which consists in addition to the electro-magnetic mechanism, essentially of a single pole double throw switch having preferably two sets of multiple contacts on each side, one for connecting the semaphore actuating power circuit and the other for connecting the lighting circuit. The semaphore power circuit contacts 242 and 243 and the lighting contacts 252 and 253 are respectively so positioned that when the controller arm 201 is moved to the left it connects the battery to energize winding 214 of magnet 212, and winding 213 of magnet 211 when turned to the right, and at the same time the winding 111 of one of the semaphore signals is connected. The controller arm 201 rotates upon the bearing 202 and has associated with it a spring mechanism 203 of any suitable type designed to normally elastically hold the arm in its center or neutral position. Attached to the arm 201 is an iron armature 204 so shaped that portions of it are near holding magnets 212 and 232 when it is moved to the left, and near holding magnets 211 and 231 when it is moved to the right. These magnets, however, are more powerful than the returning power of the spring 203 but are not so powerful as to prevent the operator manually returning the control lever 201 before the automatic control 10 releases the lever. The magnets 211 and 212 each have two windings acting differentially and when both are energized their opposing magnetic effects balance and therefore there is exerted practically no holding power on the controller arm 201 but when two of the differential windings are energized one of the second holding magnets 231 or 232 is effective. When the vehicle is being steered in a curved direction one of these second magnets 231 and 232 holds the controller arm in its actuated position until the vehicle takes a straight ahead position when one of these last mentioned magnets holding the controller arm releases it and the spring 203 returns it to its mid or neutral position. When the controller arm is in its actuated position one of the differential windings 213 or 214 on the associated holding magnets is energized by connection with controller arm and holds the arm until one of the above mentioned second holding magnets 231 and 232 is automatically energized by the steering control contacts. Ballast coils 131 may be placed in the power circuits connecting the semaphore actuating power unit to automatically reduce the current drain after the semaphore arm has been raised to actuated position. Any other suitable means for accomplishing this can obviously be employed. Ballast coils 331 may also be inserted in the connections from the automatic control 10 with the lighting circuits. This ballast preferably has a long time constant so as not to dim the lights under ordinary actuation but comes into effect to cut down the current on this circuit after some time had elapsed such as when the vehicle is parked with the steering wheels turned out of a straight ahead position. These current saving devices are optional and may or may not be used in the circuits. As here shown, the left and right rear signals each comprise two lamps 401 and 411, the former in a circuit manually controlled by the driver and the latter in a circuit automatically controlled. When both of these lamps in the rear signal are lighted lamps 121 and 301 are at maximum brightness. The rear lights may have any suitable legend associated with them such as an arrow pointing in the direction a turn is to be made or they may exhibit different colors. Further, the circuit arrangement is such that when both manual and automatic connections are made a larger amount of current flows through the semaphore lamp 121 and the telltale lamp 301 thus causing them to appear with extra brilliance when both the manual and automatic control are causing energization of the lighting circuits. It is to be understood that the lamp in the semaphore arm lights either with normal or extra brilliance. The position of lamps 401 and 411 may be interchanged with lamp 301 thus using the two lamps in the telltale signal and the one at the rear, the latter becoming extra bright where the lamp in a semaphore becomes extra bright. Various modifications of the signal lighting arrangements are obviously within the scope of this invention. The automatic return of the driver's controller arm to its neutral or mid-position is brought about by the deenergization of secondary holding magnets 231 or 232 by the automatic control 10, opening the circuit and by the fact that the two differentially connected windings 235 and 236 on each of the magnets 211 and 212 respectively during their simultaneous energization neutralize their magnetic effects and thus the holding power, at this moment, of all magnets is substantially nil which permits the spring 203 to almost instantaneously return the controller arm. To slow down the building up of a magnetic field in the magnets 211 and 212 when their neutralizing winding is deenergized, the electro-dynamic damping secondary coils 215 and 216, respectively, are employed. These damping coils, while desirable, are not absolutely necessary.

It will be noted that this system is useful for various purposes. In the first place, it provides a safety signal for showing a person in the following vehicle whether or not a turn is contemplated or has been actually started. It also shows such person whether or not the driver of the vehicle ahead has operated his manual control signal in the proper manner or whether he has neglected to so operate the manual signal. In the latter event, the automatic signal operates when the turn is begun. This serves as an additional safety warning that the driver has neglected to operate the manual signal and also indicates to an observer that a turn has been actually begun without operating the manual signal.

The system described employs various types of differently distinguishable signals which are actuated by the manual and automatic controls. In one embodiment a semaphore signal is used having an arm which is actuated only by the manual control. The automatic control, however, illuminates the arm without actuating the same while the manual control both actuates and illuminates the arm. It is obvious therefore to an observer that if the arm is illuminated and not raised the driver has neglected to give his manual signal and has started to turn. If, on the other hand, the arm is raised and illuminated a manual signal has been properly given.

In a further embodiment of the invention two distinctive rear signals are employed, one of which is operated by the manual control and one of which is operated by the automatic control. An observer by noting whether one or both of the signals have been operated can thus determine whether the manual or the automatic control, or both, have been actuated.

In a further embodiment, as applied particularly to the pilot light or to the light on the semaphore arm, the manual control produces a light of one intensity. The automatic control, after it is actuated, serves to increase the intensity of the light. An observer noting a light of one intensity followed by a light of increased intensity would thereby know that the manual controller has been operated prior to beginning the turn and that the turn has begun when the intensity of the light increased.

An important use for this device, in addition to providing a safety signal for the general public, is in fleets of trucks or busses which provide inspectors to determine whether or not the drivers are operating according to safety instructions. An inspector viewing the signals from outside the vehicle and even from a long distance away would know by observing the signals above described whether or not the driver had given his signal the proper time and distance before making the turn. Even from a remote point the inspector, by noting the time which elapsed between the manual and the automatic signals and estimating the speed of the vehicle, would be able to accurately ascertain the distance which the vehicle traveled between the manual and the automatic signals. This would be a positive indication as to whether or not the driver had given the manual signal at the proper point.

In addition to the above purpose the signals provide evidence to be used in case of an accident for showing whether or not the driver had given the proper manual signal. This evidence could, of course, be given by any observer who had witnessed the operations of the signals whether or not the observer knew at the time the meaning of the signals which he had seen. The system accordingly provides an additional safety factor for use in the operation of motor vehicles either by the general public or by bus and truck drivers. It is also capable of various other uses as will be apparent to a person skilled in the art.

What I claim is:

1. In a vehicle directional signal for a motor vehicle having a steering mechanism, a source of electric current, solenoid operated semaphore direction indicating members for mounting on the left and on the right of said vehicle for indicating respectively left and right turns of said vehicle, control circuits for energizing said solenoids, a respective electric bulb for illuminating each of said semaphore members, signal lamp members mounted at the rear of the vehicle for indicating left and right turns of said vehicle, telltale signals for indicating the condition of said direction indicating signals, energizing circuits for said electric bulbs, said signal lamp members and said tell-tale signals, a manual controller for actuating said energizing circuits to cause a signal indication respectively in said left or said right direction indicating signals, an electro-magnet for retaining said controller in operative position when manually operated, means associated with said electro-magnet for reducing the holding effect of said electro-magnet for causing the release of said controller by said electro-magnet, a second electro-magnet for assisting the holding of said controller in operated position, an energizing circuit connected to energize said second electromagnet when said steering mechanism is operated to cause a turning of the vehicle and means to cause said second magnet to release said manual controller when the vehicle resumes a straight ahead direction of travel.

2. A directional signal system for vehicles having steering mechanism, comprising a direction signal member visible exteriorly of said vehicle, an energizing circuit therefor having means to cause said signal member to produce two differently distinguishable signals, manual means controllable by the driver for actuating said circuit to cause said signal member to produce one of said signals, and means controllable by the steering mechanism of the vehicle when a turn is being executed for actuating said circuit to cause said signal member to produce the other of said signals, whereby the character of signal indicates to an observer whether the manual control, the automatic control, or both, have been actuated.

3. A directional signal system for vehicles having steering mechanism, comprising a direction signal member visible exteriorly of said vehicle, an energizing circuit therefor having means to cause said signal member to produce two differently distinguishable signals, manual means controllable by the driver for actuating said circuit to cause said signal member to produce one of said signals, a holding circuit for holding said signal and means controlled by the steering mechanism of the vehicle when a turn is being executed for actuating said holding circuit to hold said first signal and for actuating said energizing circuit to cause said signal member to produce the other of said signals.

4. A directional signal system for vehicles having steering mechanism, comprising a direction signal member visible exteriorly of said vehicle, an energizing circuit therefor having means to cause said signal member to produce two differently distinguishable signals, manual means controllable by the driver for actuating said circuit to cause said signal member to produce one of said signals, means controlled by the steering mechanism of the vehicle when a turn is being executed for actuating said circuit to cause said signal member to produce the other of said signals, and means controlled by the steering mechanism for actuating said circuit to restore all of said signals when the steering mechanism is returned to straight ahead position.

5. A directional signal system for vehicles having steering mechanism, comprising a direction signal member visible exteriorly of said vehicle, an energizing circuit therefor having means to cause said signal member to produce two differently distinguishable signals, manual means controllable by the driver for actuating said circuit to cause said signal member to produce one of said signals, means controlled by the steering mechanism of the vehicle when a turn is being executed for actuating said circuit to cause said signal member to produce the other of said signals, means controlled by the steering mechanism for actuating said circuit to restore all of said signals when the steering mechanism is returned to straight ahead position, and means for briefly delaying the return of said manual control means when the steering mechanism is restored to straight ahead position.

6. A directional signal system for vehicles having steering mechanism, comprising direction signal light means visible exteriorly of said vehicle and capable of producing two differently distinguishable light effects, an energizing circuit therefor, manual means controllable by the driver for actuating said circuit to cause said signal light means to produce one of said light effects, means controlled by the steering mechanism of the vehicle when a turn is being executed for actuating said circuit to cause said signal light means to produce the other of said light effects and means controlled by the steering mechanism for actuating said circuit to restore said signal lights when the turn has been completed.

7. A directional signal system for vehicles having steering mechanism, comprising direction signal light means visible exteriorly of said vehicle and capable of producing light effects of two intensities, an energizing circuit therefor, manual means controllable by the driver for actuating said circuit to cause said signal light means to produce a light effect of one intensity, means controlled by the steering mechanism of the vehicle when a turn is being executed for actuating said circuit to cause said signal lights to produce a light means effect of increased intensity, thereby indicating to an observer that the proper signal has been given by the driver and the turn has been initiated.

8. A directional signal system for vehicles having a steering mechanism, comprising a semaphore signal having an arm and a signal light carried thereby, a control circuit to actuate said arm and an energizing circuit to energize said signal light, manual means controlled by the driver for causing said control circuit to actuate said semaphore arm and said energizing circuit to energize said signal light, and an additional energizing circuit controlled by the steering mechanism when a turn is being executed for energizing said signal light without actuating the arm, thereby indicating to an observer whether the manual means has been properly actuated.

9. A directional signal system for vehicles having steering mechanism, comprising a semaphore direction signal and a signal light, said semaphore direction signal having an arm, a control circuit to actuate said arm, means including an energizing circuit to illuminate said arm, means including a second energizing circuit to energize said signal light to produce two differently distinguishable light effects, manual means controllable by the driver for causing said control circuit to actuate said arm and causing said second energizing circuit to energize said signal light so as to produce one of said light effects, and means controlled by the steering mechanism of the vehicle when a turn is being executed and operating independently of said manual means to cause said first energizing circuit to illuminate said arm without actuating the same and to cause said second energizing circuit to energize said signal light so as to produce the other of said light effects thereby indicating to an observer whether the manual means has been properly actuated.

JAMES P. BEDFORD.